(12) United States Patent
Hallikainen

(10) Patent No.: US 12,494,637 B2
(45) Date of Patent: Dec. 9, 2025

(54) DCDC CONVERTERS

(71) Applicant: Nordic Semiconductor ASA, Trondheim (NO)

(72) Inventor: Samuli Hallikainen, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 18/816,798

(22) Filed: Aug. 27, 2024

(65) Prior Publication Data
US 2025/0079830 A1 Mar. 6, 2025

(30) Foreign Application Priority Data
Aug. 30, 2023 (GB) ..................................... 2313213

(51) Int. Cl.
| | |
|---|---|
| H02M 3/158 | (2006.01) |
| H02J 1/08 | (2006.01) |
| H02J 1/14 | (2006.01) |
| H02M 1/00 | (2006.01) |
| H02M 3/156 | (2006.01) |

(52) U.S. Cl.
CPC ................ H02J 1/14 (2013.01); H02J 1/082 (2020.01); H02M 1/008 (2021.05); H02M 1/009 (2021.05); H02M 3/1566 (2021.05); H02M 3/158 (2013.01)

(58) Field of Classification Search
CPC ............ H02J 1/14; H02J 1/082; H02M 1/008; H02M 1/009; H02M 3/1566; H02M 3/158
See application file for complete search history.

(56) References Cited

U.S. PATENT DOCUMENTS

| | | | |
|---|---|---|---|
| 11,881,778 B2 | 1/2024 | Hallikainen | |
| 2006/0221649 A1 | 10/2006 | Yamanaka et al. | |
| 2008/0231115 A1 | 9/2008 | Cho et al. | |
| 2012/0080945 A1* | 4/2012 | Vasadi | H02M 3/158 |
| | | | 307/31 |

(Continued)

FOREIGN PATENT DOCUMENTS

| | | |
|---|---|---|
| EP | 2 622 723 B1 | 1/2019 |
| EP | 3432454 A1 | 1/2019 |

(Continued)

OTHER PUBLICATIONS

IPO Search Report under Section 17 for Great Britain Application No. GB2313213.7, dated Feb. 9, 2024, 4 pages.

(Continued)

*Primary Examiner* — Daniel Cavallari
(74) *Attorney, Agent, or Firm* — Klarquist Sparkman, LLP

(57) ABSTRACT

A circuit portion comprises a DCDC converter arranged to provide current from an output of the converter to one of a plurality of loads at a time. The plurality of loads includes a low priority load and a primary load. In response to the controller detecting, while the DCDC converter is providing current to the low priority load, that the voltage across the primary load is below a first threshold, channel logic circuitry is configured to stop providing current from the output of the converter to the low priority load and to provide current from the output of the converter to the primary load. A voltage regulator provides current to the low priority load when the voltage across the low priority load is below a second threshold.

13 Claims, 4 Drawing Sheets

(56) References Cited

U.S. PATENT DOCUMENTS

| | | |
|---|---|---|
| 2012/0286576 A1 | 11/2012 | Jing et al. |
| 2013/0082673 A1 | 4/2013 | Sako |
| 2015/0062108 A1 | 3/2015 | Archibald |
| 2016/0379581 A1 | 12/2016 | Takenaka |
| 2017/0093278 A1 | 3/2017 | Unno et al. |
| 2017/0373597 A1 | 12/2017 | Kato et al. |
| 2019/0199215 A1 | 6/2019 | Zhao et al. |
| 2022/0115950 A1 | 4/2022 | Hallikainen |
| 2022/0115951 A1 | 4/2022 | Hallikainen |
| 2023/0402919 A1 | 12/2023 | Hallikainen |

FOREIGN PATENT DOCUMENTS

| | | |
|---|---|---|
| GB | 2600389 A | 5/2022 |
| JP | 2018074850 | 5/2018 |

OTHER PUBLICATIONS

Martinez et al., "Single-Input Dual-Output (SIDO) Linear-Assisted DC/DC Converter," XVI Annual Seminar on Automation, Industrial Electronics and Instrumentation, 2008, 6 pages.

\* cited by examiner

DCDC CONVERTERS

CROSS REFERENCE TO RELATED APPLICATION

This application claims priority to United Kingdom Patent Application No. 2313213.7, filed Aug. 30, 2023, which application is incorporated herein by reference in its entirety.

BACKGROUND OF THE INVENTION

The present invention relates to DCDC converters which typically convert a DC voltage to a lower DC voltage. It relates specifically but not exclusively to single-input multiple output (SIMO) step-down DCDC "Buck" converters.

Modern portable electronic devices are typically provided with a power source such as a battery that acts as a direct current (DC) power supply for the various electronic components within the device. However, typically these components will have different voltage requirements and so it is conventional for such devices to employ one or more DCDC converters that step a nominal voltage associated with the power supply down to a voltage appropriate for the different electronic components. While this could be achieved by using a potential divider network (e.g. a series of resistors) to create a number of "taps" having different voltages, this is highly inefficient as energy is simply wasted as heat dissipated across the resistors.

One alternative arrangement known in the art per se is a Buck converter. A Buck converter circuit utilises an inductor-capacitor or "LC" circuit which is periodically connected to and disconnected from the power supply (e.g. by intermittently opening and closing a switch, typically implemented as a transistor referred to as the "high-side" (HS) transistor) by a driver in order to step down the voltage. This can be seen as an electrical equivalent to a mechanical flywheel, wherein energy is periodically input to the system to keep it outputting energy at a steady rate. The ratio of the output voltage to the input voltage can be adjusted by altering the duty cycle of a pulse width modulated (PWM) or pulse frequency modulated (PFM) drive signal produced by the driver that is applied to the gate of the high-side transistor in order to turn the transistor on or off.

A synchronous Buck converter circuit replaces what is known as the "freewheeling" or "flyback" diode typically found in some designs with a second transistor, often referred to as the "low-side" (LS) transistor. The driver then turns off the low-side transistor when turning on the high-side transistor and vice versa by applying appropriate PWM or PFM drive signals to the high- and low-side transistors to control them so as to intermittently couple the LC circuit to the input voltage. This improves the efficiency of the Buck converter in exchange for increasing the bill of materials associated with the circuit.

A Buck converter may be implemented in a circuit, e.g. on a system-on-chip (SoC), and arranged to deliver power to multiple loads (i.e. a Single-Input Multiple Output (SIMO) Buck converter). In such systems, the power could be rotated asynchronously between the output loads in hysteretic (PFM) mode. In this mode, power is supplied to each load on request. If none of the outputs requests charge, the converter idles. Alternatively, PWM mode may be used, in which the supply of power is rotated between each load in turn according to a fixed repeated sequence, such that the load switching is synchronised with a clock signal. Operating the converter in this mode allows a predictable switching noise spectrum to be achieved.

It is common for SoCs to experience large variations in loading depending on the individual operation of the constituent components. In conventional arrangements, if a DCDC converter is used to provide power to the loads of the SoC, it is necessary to dimension the DCDC converter for the highest-load scenario, which may occur infrequently. This can be a source of significant inefficiency in terms of cost and power.

The present invention seeks to provide an improved circuit for delivering power to multiple loads efficiently using a DCDC converter.

SUMMARY OF THE INVENTION

When viewed from a first aspect, the invention provides a circuit portion comprising:
- a DCDC converter arranged to provide current from an output of the converter to one of a plurality of loads at a time, wherein the plurality of loads comprises at least a low priority load and a primary load;
- a controller configured to detect when a voltage across the primary load from the DCDC converter is below a first threshold for the primary load;
- channel logic circuitry configured, in response to the controller detecting, while the DCDC converter is providing current to the low priority load, that the voltage across the primary load is below the first threshold for the primary load, to stop providing current from the output of the converter to the low priority load and to provide current from the output of the converter to the primary load; and
- a voltage regulator configured to provide current to the low priority load when the voltage across the low priority load is below a second threshold for the low priority load.

Thus, it will be appreciated by those skilled in the art that in accordance with the present invention a circuit comprising channel logic circuitry may deprioritise a load that is being supplied by a DCDC converter when it is determined that the voltage across a primary load is lower than a threshold. Rather than providing current from the DCDC converter to the deprioritised load, the current is then provided to the primary load instead. However, when the voltage across the deprioritised load falls below a second threshold, a voltage regulator is configured to supplement the current provided to the load.

This means that, during periods of high loading, instead of attempting to supply both the low priority load and the primary load using the DCDC converter, embodiments of the present invention may deliberately remove the supply of output current from the DCDC converter to the low-priority load. The current demanded by the low priority load may then be met by the voltage regulator when the voltage across the low priority load falls below the second threshold. As a result of this deprioritisation of the low priority load, the primary load can receive a greater proportion of the output of the DCDC converter which helps to ensure that the demand of the primary load can be met, whilst allowing predictability of which load will need to be supplied by a supplementary voltage regulator. This allows a supplementary voltage regulator to be provided only for such loads rather than for all the loads.

By contrast, in conventional DCDC converters, multiple voltage regulators, each dedicated to a respective load, may be required in order to manage periods of high loading. Thus embodiments of the present invention may reduce the number of voltage regulators required, whilst still allowing the demands of each of the loads to be met. This can improve the efficiency of the system and reduce the overall size and complexity of the circuit.

In some embodiments, the circuit portion is arranged on an integrated circuit, e.g. a system-on-chip (SoC). The circuit may provide an input voltage to the DCDC converter and/or to the voltage regulator. The plurality of loads may comprise, by way of non-limiting examples, any of an analogue-to-digital converter (ADC), a comparator, an oscillator, a radio transmitter and/or receiver, a power amplifier, a processor, or memory.

The DCDC converter may be a step-down (e.g. "Buck") converter. The DCDC converter may comprise a high side (HS) transistor and a low side (LS) transistor. The DCDC converter may comprise an inductor. The DCDC converter may be configured to charge the inductor when the HS transistor is turned on (and the LS transistor is turned off) and to discharge the inductor when the LS transistor is turned on (and the HS transistor is turned off).

The DCDC converter may be configured to operate in Discontinuous Conduction Mode (DCM). In DCM, the current in the inductor reduces to zero between charging events of the inductor. This is in contrast to Continuous Conduction Mode (CCM), in which the current is continuously flowing in the inductor. Operating the DCDC converter in DCM can be beneficial in SIMO implementations as it may avoid poor cross-regulation between output channels in unequal loading conditions. In some embodiments, the circuit portion comprises duty control logic circuitry configured to turn on or turn off the LS transistor and the HS transistor of the DCDC converter. The duty control logic circuitry may be configured to operate the DCDC converter in DCM.

The circuit portion may comprise a duty module configured to determine a duty cycle for the DCDC converter. The duty cycle defines a ratio of time for which the inductor is charged to time for which the inductor is discharged. The duty module may comprise a pulse-width modulation (PWM) module. The duty module may comprise a pulse-frequency modulation (PFM) module. The duty module may be arranged to receive a reference voltage indicative of a desired voltage to be provided to one or more of the plurality of loads. The duty module may be configured to determine the duty cycle according to the reference voltage. The duty control logic circuitry may be configured to turn on or turn off the HS transistor or the LS transistor depending on the determined duty cycle. The duty module may comprise a comparator configured to compare the voltage provided to one or more of the plurality of loads with a respective reference voltage. The duty module may be configured to use this comparison to control the duty cycle of the DCDC converter.

The duty control logic circuitry may be configured to monitor the current in the inductor of the DCDC converter. The duty control logic circuitry may be configured to turn off the LS transistor when the current in the inductor reduces to zero. The duty control logic circuitry may comprise a zero-cross comparator configured to change output state when the current in the inductor reduces to zero. The duty control logic circuitry may be configured to turn off the LS transistor when the zero-cross comparator changes output state.

The duty control logic circuitry may be configured to compare the current through the inductor with a maximum-current threshold and, in response to determining that the current through the inductor is greater than the maximum-current threshold, the duty control logic circuitry may be configured to turn off the HS transistor and to turn on the LS transistor, thus causing the inductor to discharge. In hysteretic (PFM) operation of the DCDC converter, this sets a fixed amount of charge that is delivered to each load per cycle. This can also help to avoid damage to the inductor caused by excessive charging.

The low-priority load may be a predetermined load of the plurality of loads (i.e., the load that is 'low-priority' may be fixed). However, in some embodiments this is (re)-configurable. The channel logic circuitry may be configured to determine which of the plurality of loads is the low-priority load.

In some embodiments the plurality of loads comprises a plurality of primary loads, in addition to the low priority load. The controller is preferably configured to monitor the voltage of each of the plurality of loads. Each of the plurality of loads may be associated with a respective first threshold voltage (e.g. a minimum target voltage) at, or above, which it is desirable for the respective load to operate. In some embodiments, each of the plurality of loads is associated with a respective target voltage range within which it is desirable for the voltage across the respective load to remain. In some embodiments, the target voltage range (for each of the plurality of loads) is defined between a respective first threshold voltage (e.g. a minimum target voltage) and an upper threshold voltage (e.g. an upper target voltage). The circuit portion may be arranged to deliver one or more reference voltages, representative of the first threshold or the target voltage range (e.g. for the primary load) to the controller.

The first threshold (or, e.g. the target voltage range) may be different for each of the plurality of loads.

As used herein, an 'undersupplied' load refers to a load across which the voltage is below the first threshold for the load. Thus, the controller is configured to detect when the primary load is undersupplied (i.e. when the voltage across the primary load from the DCDC converter is below the first threshold for the primary load). An undersupplied load may be the one of the plurality of loads that is presently receiving current from the DCDC converter, or may be a different one of the plurality of loads. This means that the voltage across the load may be below the first threshold for that load even while the load is being provided with current from the DCDC converter.

In embodiments comprising a plurality of primary loads, the controller may be configured to detect when any (e.g. each) of the primary loads is undersupplied (i.e. when the voltage across the primary load from the DCDC converter is below the first threshold for that primary load). The channel logic circuitry preferably stops providing current to the low priority load from the DCDC converter if any one (or more) of the primary loads becomes undersupplied.

Multiple primary loads may become undersupplied at the same time. In response to detecting that more than one of the plurality of primary loads is undersupplied, the channel logic circuitry may determine which of the undersupplied primary loads is to be provided with the output current from the DCDC converter in any suitable way. It may make this determination according to a predetermined priority level associated with each of the plurality of primary loads. It may make this determination according to a difference between the voltage across each load and the corresponding first threshold voltage. The channel logic circuitry may be configured to determine a sequence in which current is to be provided to the loads.

In some embodiments, the channel logic circuitry is configured to provide the output current from the DCDC converter to the plurality of loads in an order that limits the amount of time that any particular load is undersupplied. The channel logic circuitry may provide the output current to the loads in the order in which their voltages fell below their respective first threshold—e.g. according to which channel request signals were generated first.

Conversely, if none of the primary loads is undersupplied, then the channel logic circuitry may provide current to the low priority load. Thus, in some embodiments, the channel logic circuitry is configured, in response to the controller detecting that the voltage across the low priority load is below the first threshold for the low priority load, to provide current from the output of the converter to the low priority load only if the voltage across each of the primary loads is above the respective first threshold for the primary loads.

The controller may be configured, in response to detecting that the voltage across a load is lower than the first threshold for the load, to issue a channel request signal that identifies the load as undersupplied. The channel request signal may be used by the channel logic circuitry to determine whether to provide current from the output of the converter to the load. The channel logic circuitry may be configured to use the channel request signal to ensure that the identified load is scheduled to receive current if it is not already receiving it.

The channel logic circuitry may be configured to output a channel selection signal identifying the load that is to receive the output current from the DCDC converter.

In some embodiments, the channel request signal is used by the duty control logic circuitry to control the HS transistor and the LS transistor of the DCDC converter. The duty control logic circuitry may be configured to turn on the HS transistor when the channel request signal is asserted. The duty control logic circuitry may be configured to turn off the HS transistor and to turn on the LS transistor when the channel request signal is deasserted.

The circuit portion may comprise a multiplexer via which the channel request signal is provided to the duty control logic circuitry. The multiplexer may be configured to receive a plurality of channel request signals from the controller, each channel request signal corresponding to a respective one of the plurality of loads. The multiplexer may be configured to forward, to the duty control logic circuitry, the channel request signal corresponding to the undersupplied load in response to receiving a channel selection signal from the channel logic circuitry identifying the undersupplied load.

The controller may be configured, in response to detecting that the voltage across the undersupplied load is greater than the upper threshold voltage for the undersupplied load, to stop issuing said channel request signal identifying the undersupplied load. Thus, when a load has received sufficient current from the DCDC converter such that the voltage across the load reaches the upper threshold voltage, the controller may stop issuing a channel request signal identifying said load as requiring additional current (i.e. as being undersupplied). This means that the output of the DCDC converter can be provided to a different load if necessary.

The controller may be configured to detect when the voltages across a plurality of loads are below respective first thresholds (i.e. to detect a plurality of undersupplied loads). The controller may issue a plurality of channel request signals, each identifying a different undersupplied load, at the same time.

The controller may comprise one or more minimum-threshold comparators configured to compare the voltage provided to one or more of the loads with the first threshold associated with a given load. The controller may comprise a dedicated minimum-threshold comparator for each of the plurality of loads. Each of the one or more minimum-threshold comparators may be arranged to output a corresponding channel request signal upon detecting an undersupplied load.

In some embodiments, the upper threshold for a load is equal to the first threshold for the load. However, in some embodiments, owing to inherent hysteresis in the one or more minimum-threshold comparators, the voltage at the time that the comparator actually detects that the upper threshold has been exceeded may be different to the voltage at the time that the comparator actually detects that the voltage has dropped below the first threshold.

In some embodiments, the controller comprises one or more upper-threshold comparators that are separate from the minimum-threshold comparators. Thus, the controller may comprise one or more upper-threshold comparators configured to compare the voltage provided to one or more of the loads with the corresponding upper threshold voltage. The controller may comprise a dedicated upper-threshold comparator for each of the plurality of loads. The or each upper-threshold comparator may be configured to disable a respective minimum-threshold comparator in response to detecting that the voltage provided to a corresponding load is greater than the corresponding upper threshold voltage. Thus, in such arrangements, when the voltage reaches the corresponding upper threshold voltage, the channel request signal (issued by the minimum-threshold comparator) is deasserted.

The channel logic circuitry may be configured to provide current from the output of the converter to an undersupplied load in response to receiving the channel request signal for said undersupplied load. The channel logic circuitry may comprise one or more channel selection switches (e.g. transistors), operable to selectively establish an electrical connection between the output of the DCDC converter and one or more of the plurality of loads. This allows the current provided by the DCDC converter to flow to the selected load, thus increasing the voltage across the load.

In some embodiments, the circuit portion comprises a respective voltage channel for each of the plurality of loads for providing current from the DCDC converter to the respective load. Each channel may be arranged to provide a different respective voltage to the respective load.

Preferably, the low priority load requires a higher voltage than (e.g. each of) the primary load(s). By deprioritising the highest voltage load in favour of the lower voltage loads, the efficiency of the system can be improved. This is because the deprioritised load is supplied by a voltage regulator when the voltage across the load falls below the second threshold. The power loss in a voltage regulator is directly proportional to the conversion ratio (i.e. the ratio of $V_{in}$ to $V_{out}$), which means that the efficiency of the voltage regulator is highest at small conversion ratios, when $V_{out}$ is close to $V_{in}$. Therefore, providing a supplementary voltage regulator for the highest voltage output load, rather than a lower voltage output load, can improve the efficiency of the circuit.

Preferably, the controller is configured to detect when a voltage across the low priority load from the DCDC converter is below a first threshold for the low priority load (i.e. to detect when the low priority load is undersupplied). In response, provided that a/the primary load is not undersupplied at the same time, then the channel logic circuitry may provide current to the low priority load from the DCDC converter. The channel logic circuitry may do this immediately or it may wait until the start of the next charge-discharge cycle of the DCDC converter. Preferably the channel logic circuitry is only configured to provide current to the low priority load from the DCDC converter if the primary load is not undersupplied (or if none of a plurality of primary loads is undersupplied).

In some embodiments, the controller is configured to detect that the voltage across a load (e.g. the low priority load or the primary load) is greater than an upper threshold for the load. This may indicate that the load is no longer undersupplied.

The channel logic circuitry may be configured, in response to the controller detecting, while the DCDC converter is providing current to the primary load, that the voltage across the low priority load is below the first threshold for the low priority load, to continue to provide current from the output of the converter to the primary load at least until the controller detects that the voltage across the primary load is greater than the upper threshold. Thus, in some embodiments, the supply of current from the DCDC converter to the primary load is not interrupted when it is detected that the low-priority load is undersupplied. Instead, the controller may wait at least until the voltage across the primary load is greater than the upper threshold for the primary load (e.g. until the primary load is no longer undersupplied).

The voltage regulator may be arranged in parallel with the DCDC converter. In some embodiments, the voltage regulator comprises a low-dropout voltage regulator (LDO). The second threshold may be equal to the target voltage of the LDO. Thus, it will be appreciated that, when the voltage across the low priority load is below the second threshold, the LDO will begin to conduct.

This means that the LDO can be seamlessly brought into operation without the need for additional circuitry in order to effect a logical handover between the DCDC converter and the LDO. This means that the DCDC converter can be kept active together with the LDO. The LDO may draw only a small current when the voltage across the low priority load is above the second threshold, and only be brought into use when it is needed to replace the current that has ceased to be provided to the low priority load by the DCDC converter.

The second threshold for the low priority load is typically lower than the first threshold for the low priority load.

In some embodiments, the circuit portion comprises a plurality of low priority loads—some or all of which could share the voltage regulator, or wherein some or all of them are associated with respective dedicated voltage regulators, such as LDOs. Where multiple voltage regulators are provided they may have different target voltages, depending on the requirements of the respective load(s).

It will be understood that in such embodiments references herein to the low priority load may be understood to refer equally to one or any of the low priority loads.

This may allow more loads to continue to be provided with current in the event of particularly high loading.

BRIEF DESCRIPTION OF THE DRAWINGS

An embodiment of the invention will now be described, by way of non-limiting example only, with reference to the accompanying drawings, in which.

DETAILED DESCRIPTION

Figure 1:
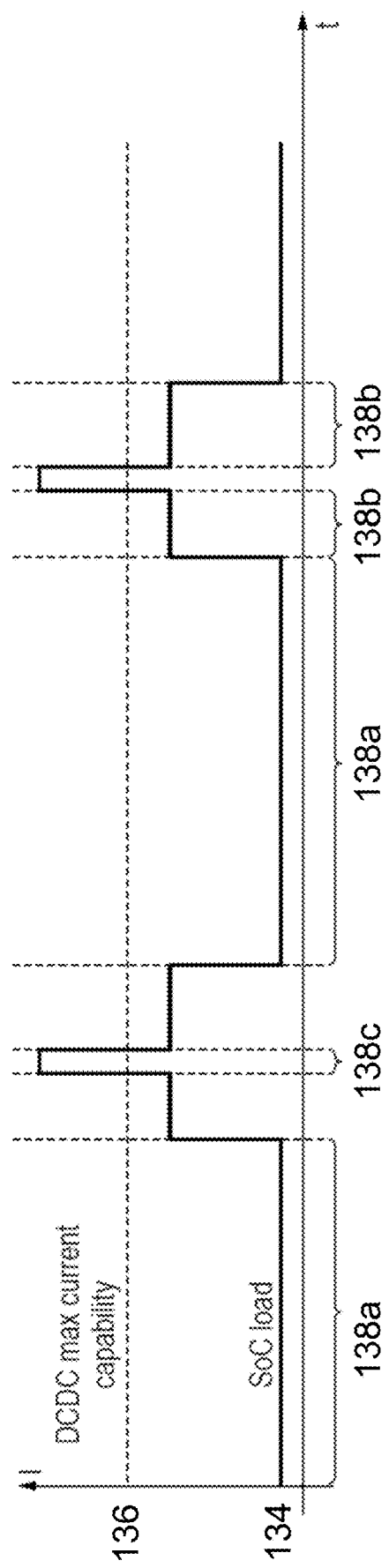
FIG. 1 is a graph showing a typical SoC load profile.

A typical load profile 134 for a SoC, comprising as SIMO DCDC Buck converter, is shown in FIG. 1.

The SoC load profile 134 is the total current I required by all of the loads on the SoC over time t. The maximum current that can be supplied by the Buck converter is shown by the horizontal dotted line 136. As can be seen in FIG. 1, the typical SoC load profile 134 comprises a number of very long low-load periods 138*a*, short moderate-load periods 138*b*, and very short, and usually infrequent, heavy-load periods 138*c*. Such heavy-load periods 138*c* may be caused by the combination of an active radio frequency power amplifier and a high speed memory event, for example.

In FIG. 1 it is clear that the DCDC converter fails to deliver the current required by the SoC during the heavy-load periods 138*c*. Although this can be overcome by increasing the size of the DCDC converter to raise its maximum current capability, this can often result in a lower overall system efficiency, especially in the case of SIMO DCDC converters. Owing to the infrequency of such heavy-load periods 138*c*, it can be inefficient in terms of cost and power to implement a large DCDC converter when the upper range of its current capability is likely to be required so infrequently.

Figure 2:
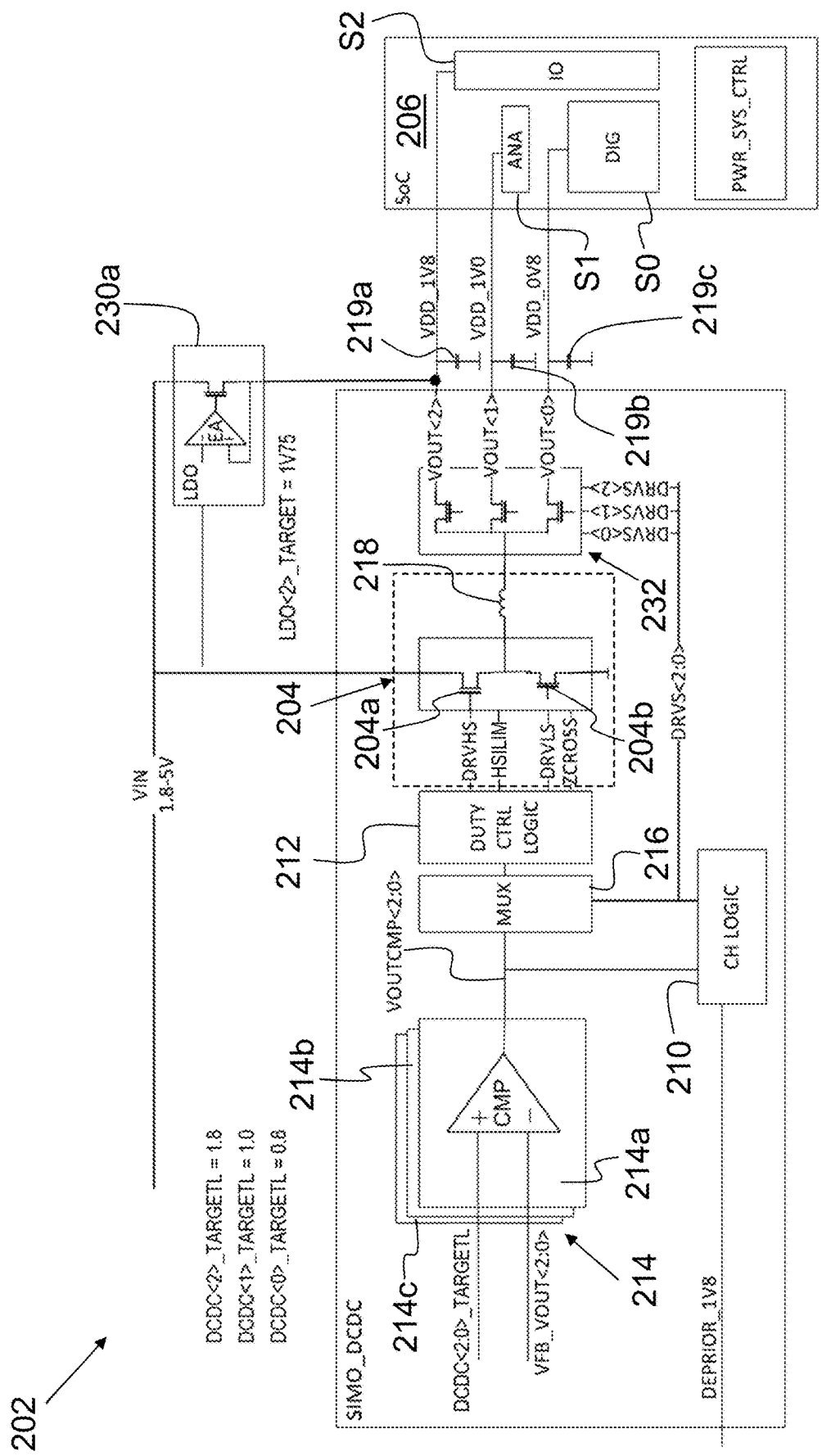
FIG. 2 is a schematic diagram of a circuit portion in accordance with an embodiment of the present invention.

FIG. 2 shows a circuit 202 in accordance with an embodiment of the present invention. The circuit 202 is arranged on a system-on-chip (SoC) and comprises a single-input multiple-output (SIMO) step-down DCDC Buck converter 204 that receives an input voltage $V_{in}$ and provides a load current and load voltage $V_{out}$ to a domain 206. The domain 206 comprises a 1.8V channel, a 1V channel, and a 0.8V channel. Each channel is independently electrically connected to the output of the Buck converter 204 to provide power to three loads S2, S1, S0 respectively.

The circuit 202 further comprises a low drop-out regulator (LDO) 230*a* connected in parallel with the Buck converter 204 between the input voltage source and the low-priority load S2. The load S2 is denoted as a low-priority load because it has a supplementary LDO associated with it. By contrast loads S0, S1 are denoted as primary loads because they do not have an associated LDO.

The circuit 202 further comprises channel logic circuitry 210 that alternates the supply of power output from the Buck DCDC converter 204 between the three power channels and, thus, between the respective loads S2, S1, S0. Each power channel comprises a capacitor 219*a*, 219*b*, 219*c* that is charged while the DCDC converter 204 is providing current to the respective power channel, and subsequently discharges to provide current to the loads S2, S1, S0. As each capacitor 219*a*, 219*b*, 219*c* discharges, the voltage provided to the respective load S2, S1, S0 will decrease.

The circuit 202 further comprises a controller 214, a multiplexer 216, and duty control logic 212. The controller 214 comprises a minimum-threshold comparator 214*a*, corresponding to the load S2, that compares the voltage VOUT<2> supplied to the load S2 with a respective minimum target voltage DCDC<2>_TARGETL for the load S2. The controller 214 also comprises two further minimum-threshold comparators 214*b*, 214*c*, corresponding to loads S1 and S0, although, for simplicity, these are not shown in detail in FIG. 2. These further minimum-threshold comparators operate in the same way as the minimum-threshold comparator 214a described herein, but each is dedicated to its own load S1, S0 respectively. In this way, the controller 214 identifies which of the loads are undersupplied.

The voltage VOUT<2>, VOUT<1>, VOUT<0> supplied to the loads S2, S1, S0 falls over time as a result of the discharging of the corresponding capacitor, 219a, 219b, 219c. In response to determining that the voltage VOUT<2>, VOUT<1>, VOUT<0> supplied to the load S2, S1, S0 has fallen below the minimum target voltage DCDC<2>_TARGETL, DCDC<1>_TARGETL, DCDC<0>_TARGETL, (i.e. that one or more of the respective loads S2, S1, S0 is undersupplied) the minimum-threshold comparator 214a, 214b, 214c sends a channel request signal VOUTCMP2, VOUTCMP1, VOUTCMP0 to the channel logic circuitry 210 and to an input of the multiplexer 216.

The minimum-threshold comparators 214a, 214b, 214c stop issuing respective channel request signals VOUTCMP2, VOUTCMP1, VOUTCMP0 upon detecting that the supplied voltage VOUT<2>, VOUT<1>, VOUT<0> is greater than the respective minimum target voltage DCDC<2>_TARGETL, DCDC<1>_TARGETL, DCDC<0>_TARGETL. However, owing to inherent hysteresis in the minimum-threshold comparators 214a, 214b, 214c, this change is not made until the supplied voltage VOUT<2>, VOUT<1>, VOUT<0> reaches the respective upper target voltage DCDC<2>_TARGETH, DCDC<1>_TARGETH, DCDC<0>_TARGETH, at which point the respective minimum-threshold comparator 214a, 214b, 214c ceases to output the channel request signal VOUTCMP2, VOUTCMP1, VOUTCMP0 for the corresponding channel to the channel logic circuitry 210 and the multiplexer 216.

The channel logic circuitry 210 determines, from the channel request signals, VOUTCMP<2>, VOUTCMP<1>, VOUTCMP<0> received from the controller 214, which of the output channels is to receive the output current from the Buck converter 204. The channel logic circuitry 210 issues channel selection signals DRVS<2>, DRVS<1>, DRVS<0> identifying the chosen output channel.

If only one channel request signal VOUTCMP2, VOUTCMP1, VOUTCMP0 has been asserted at a particular time, the channel logic circuitry 210 will issue the channel selection signal DRVS<2>, DRVS<1>, DRVS<0> corresponding to that channel.

If more than one channel request signal VOUTCMP2, VOUTCMP1, VOUTCMP0 is asserted at the same time, the channel logic circuitry 210 will make the determination as to which channel is to receive the output from the Buck converter 204. As described above, in the circuit 202 shown in FIG. 2, the load S2 is a low-priority load, whereas the loads S0, S1 are primary loads. Thus, if the channel request signal VOUTCMP2 (corresponding to the low-priority load S2) is asserted at the same time as the channel request signal VOUTCMP1 (corresponding to load S1) and/or the channel request signal VOUTCMP0 (corresponding to load S0), then the channel request signal VOUTCMP2 corresponding to the low-priority load S2 is blocked, meaning that the channel logic circuitry 210 will not issue the channel selection signal DRVS<2>. Instead, the channel logic circuitry 210 will issue the channel selection signal DRVS<1> or the channel selection signal DRVS<0>.

If both the channel request signal VOUTCMP1 and the channel request signal VOUTCMP0 (i.e. the channel request signals corresponding to the primary loads S0, S1) are asserted at the same time, the channel logic circuitry 210 will make the determination as to which primary load is to receive the output from the Buck converter 204 by applying an algorithm which ensures that the length of time that a particular undersupplied primary load is waiting to be supplied by the Buck converter 204 is minimised.

The channel selection signals DRVS<2>, DRVS<1>, DRVS<0> are provided to the multiplexer 216, which responds by forwarding the corresponding channel request signal VOUTCMP2, VOUTCMP1, VOUTCMP0 to the duty control logic circuitry 212. Channel selection switches 232 are also respectively controlled by the channel selection signals DRVS<2>, DRVS<1>, DRVS<0> and thus establish electrical connections between the Buck converter 204 and the loads S2, S1, S0 depending on the determination of the chosen channel by the channel logic circuitry 210.

The duty logic circuitry 212, in response to receiving channel request signals VOUTCMP2, VOUTCMP1, VOUTCMP0, issues duty control signals DRVHS, DRVLS to the HS and LS transistors 204a, 204b of the Buck converter 204 so that the required output current is delivered to the load S2, S1, S0. The duty control logic circuitry 212 monitors the current that flows through the inductor 218 during the charging period (while the HS transistor 204a is turned on) and outputs a current limiter signal HSILIM when a predetermined maximum current is reached. The current limiter signal HSILIM is issued as part of a regulation loop between the duty control logic circuitry 212 and the Buck converter 204. This regulation loop ensures that a fixed maximum amount of charge is delivered to each load per cycle in hysteretic (PFM) operation of the Buck converter 204.

The inductor 218 of the Buck converter 204 can be magnetised (charged) and demagnetised (discharged) depending on the configuration of the HS and LS transistors 204a, 204b. Thus, the duty control signals DRVHS, DRVLS issued by the duty control logic circuitry 212 control when the inductor 218 charges and discharges in the manner known per se.

The target voltage of the LDO 230a is set just below the minimum target voltage DCDC<2>_TARGETL corresponding to the low-priority load S2. Thus, should the output voltage $V_{out}$ of the Buck converter 204 fall below this, the LDO 230a begins to conduct. Situations where this may occur will be described in more detail below.

Operation of the circuit 202 shown in FIG. 2 will now be further described with reference to FIG. 3

Figure 3:
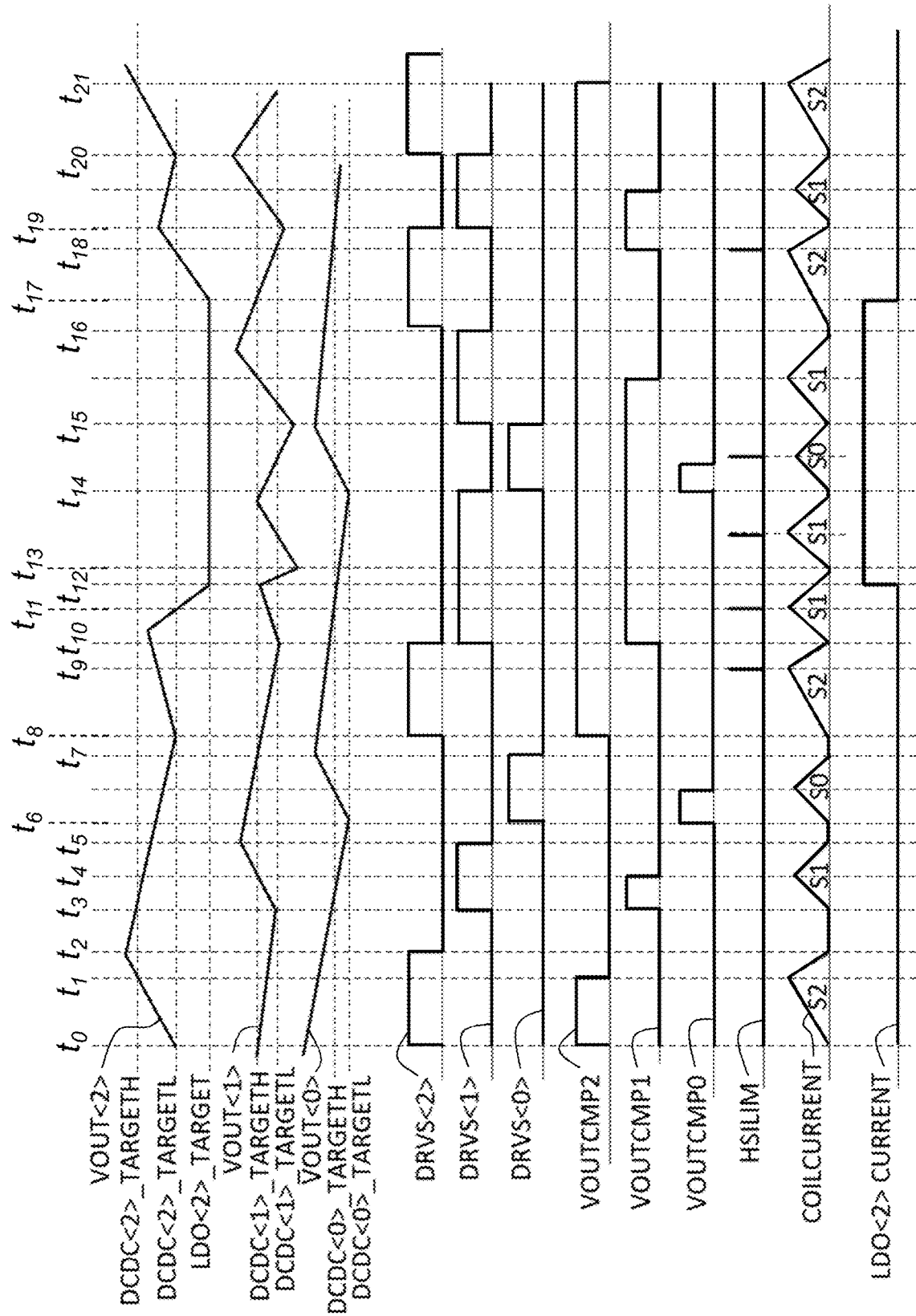
FIG. 3 is a graph of the outputs of the circuit shown in FIG. 2.

For each of the output loads S2, S1, S0 respectively, FIG. 3 shows traces of the voltage VOUT<2>, VOUT<1>, VOUT<0> supplied, the channel selection signals DRVS<2>, DRVS<1>, DRVS<0> produced by the channel logic circuitry 210, and the channel request signals VOUTCMP2, VOUTCMP1, VOUTCMP0 produced by the controller 214. The minimum target voltage DCDC<2>_TARGETL (the first threshold voltage), the upper target voltage DCDC<2>_TARGETH (taking into account hysteresis in the respective minimum-threshold comparator 214a) and the LDO target voltage LDO<2>_TARGET for the load S2 are shown as horizontal dotted lines at the top of FIG. 3. The minimum and upper target voltages for the loads S1, S0 are also shown.

FIG. 3 also shows the current COILCURRENT that is supplied to the loads S2, S1, S0 by the Buck converter 204, the current LDO<2> CURRENT that is supplied to the load S2 by the LDO 230a, and the trace of the signal HSILIM issued by the duty control logic circuitry 212.

In this exemplary embodiment, a logic high channel selection signal DRVS<2>, DRVS<1>, DRVS<0> indicates that the corresponding load S2, S1, S0 will receive the output current from the Buck converter 204.

At time $t_0$, it can be seen in FIG. 3 that the voltage VOUT<2> supplied to the load S2 is equal to the minimum target voltage DCDC<2>_TARGETL. Thus, the comparator 214a of the controller 214 issues a logic high channel request signal VOUTCMP2 to the channel logic circuitry 210 and the multiplexer 216. In response to the logic high channel request signal VOUTCMP2, the channel logic circuitry 210 issues a logic high channel selection signal DRVS<2>, thereby indicating that the load S2 is to receive the output current COILCURRENT from the Buck converter 204.

The channel selection signal DRVS<2> is provided to the multiplexer 216, which causes the multiplexer 216 to forward the channel request signal VOUTCMP2 to the duty control logic 212. The duty control logic 212 then turns on the HS transistor 204a of the Buck converter 204 (and turns off the LS transistor 204b) to cause the inductor 218 to charge. This results in an increase in the current COILCURRENT in the inductor 218, as shown by the rising slope. Consequently, the voltage VOUT<2> provided to load S2 also increases, as shown in the top trace in FIG. 3.

At time $t_1$, the minimum-threshold comparator 214a detects that the voltage VOUT<2> has risen above the maximum target threshold DCDC<2>_TARGETH.

This causes the minimum-threshold comparator 214a to cease outputting the channel request signal VOUTCMP2 to the duty control logic circuitry 212 via the multiplexer 216. As a result, the duty control logic circuitry 212 issues a low side duty control signal DRVLS (not shown in FIG. 3) that deactivates the HS transistor 204a of the Buck converter 204 and activates the LS transistor 204b. As a result, the current COILCURRENT in the inductor 218 is discharged, as shown by the falling slope. As the inductor 218 discharges, the voltage VOUT<2> provided to the load S2 continues to rise. At time $t_2$, the current COILCURRENT in the inductor 218 reaches zero, thus triggering a zero-cross comparator signal (not shown) that causes the duty control logic circuitry 212 to deactivate the LS transistor 204b.

The channel logic circuitry 210, when the channel request signal VOUTCMP2 is not asserted, ceases outputting a logic high channel selection signal DRVS<2> when the zero-cross comparator signal is triggered at time $t_2$. Between times $t_2$ and $t_8$, the capacitor 219a discharges to supply current to the load S2. This causes the voltage VOUT<2> provided to the load S2 to decrease (as shown by the falling slope of VOUT<2>).

At time $t_3$, the voltage VOUT<1> supplied to the load S1 has dropped to the minimum target voltage DCDC<1>_TARGETL. Thus, the minimum-threshold comparator 214b of the controller 214 issues a logic high channel request signal VOUTCMP1 to the channel logic circuitry 210. In response to the logic high channel request signal VOUTCMP1, the channel logic circuitry 210 issues a logic high channel selection signal DRVS<1>, thereby indicating that load S1 is to receive the output current COILCURRENT from the Buck converter 204. The channel selection signal DRVS<1> causes the channel selection switches 232 to trigger so that the output of the Buck converter 204 is delivered to the load S1.

The channel selection signal DRVS<1> is also provided to the multiplexer 216, which causes the multiplexer 216 to forward the channel request signal VOUTCMP1 to the duty control logic 212. The duty control logic circuitry 212 then turns on the HS transistor 204a of the Buck converter 204 (and turns off the LS transistor 204b) to cause the inductor 218 to charge, as described above. This results in an increase in the current COILCURRENT in the inductor 218 as shown by the rising slope. Consequently, the voltage VOUT<1> provided to load S1 also increases.

Between time $t_3$ and time $t_5$, the duty control logic circuitry 212 issues duty control signals DRVHS, DRVLS to control the HS and LS transistors 204a, 204b of the Buck converter 204 in the same way as described above. The controller 214 ceases outputting a logic high channel request signal VOUTCMP<1> when, at time $t_4$, the minimum-threshold comparator determines that the voltage VOUT<1> provided to the load S1 has reached the upper target voltage DCDC<1>_TARGETH corresponding to the load S1. This causes the duty control logic circuitry 212 to issue the low side duty control signal DRVLS indicating that the inductor 218 of the Buck converter 204 may begin to discharge as shown by the falling slope of COILCURRENT. The channel logic circuitry 210 ceases outputting a logic high channel selection signal DRVS<1> when the zero-cross comparator signal is triggered at time $t_5$.

At time $t_6$, the voltage VOUT<0> supplied to load S0 drops to the minimum target voltage DCDC<0>_TARGETL. Thus, between time $t_6$ and time $t_7$, current COILCURRENT is delivered to this load S0 in the same way as that described above.

At time $t_8$, the voltage VOUT<2> supplied to the load S2 once again drops to the minimum target voltage DCDC<2>_TARGETL. Thus, a logic high channel request signal VOUTCMP2 is asserted by the controller 214 and, in response, the channel logic circuitry 210 issues a logic high channel selection signal DRVS<2>. This causes current COILCURRENT to be supplied to the load S2 in the same way as described above.

At time $t_9$ the duty control logic circuitry 212 determines that the current provided to the inductor 218 has reached the predetermined maximum current and consequently issues the current limiter signal HSILIM. The current limiter signal HSILIM causes the duty control logic circuitry 212 to stop issuing the high side duty control signal DRVHS and to issue a low side duty control signal DRVLS signal instead, thereby turning off the HS transistor 204a (and turning on the LS transistor 4b) so that the inductor 218 begins to discharge. Thus, the duty control logic circuitry 212 is configured such that it can begin the discharge portion of the charge-discharge cycle of the inductor 218 in response to either i) the channel request signal VOUTCMP2, VOUTCMP1, VOUTCMP0 being deasserted, as described above, or ii) receiving a current limiter signal HSILIM.

At time $t_{10}$ the voltage VOUT<1> supplied to the load S1 falls to the minimum target voltage DCDC<1>_TARGETL. This causes a logic high channel request signal VOUTCMP1 to be output from the minimum-threshold comparator 214b of the controller 214 to the channel logic circuitry 210.

However, it will be seen that a logic high signal VOUTCMP2 continues to be asserted by the minimum-threshold comparator 214a of the controller 214, as well as a logic high signal VOUTCMP1 by the minimum-threshold comparator 214b. The channel request signal VOUTCMP2 continues to be asserted because, during the time between time $t_8$ and time $t_{10}$, the voltage VOUT<2> provided to the load S2 failed to reach the upper target voltage DCDC<2>_TARGETH.

The channel logic circuitry 210 determines which of the output channels to activate, according to predetermined logic. In this instance, as the channel request signal VOUTCMP2 corresponds to the low-priority load S2, the channel logic circuitry 210 prioritises the other asserted channel request signal VOUTCMP1 and consequently switches the active channel from the channel supplying load S2 to the channel supplying load S1. This is done by ceasing to output the channel selection signal DRVS<2> and instead outputting the channel selection signal DRVS<1>.

During the period between $t_{10}$ and $t_{13}$, the current COIL-CURRENT is supplied to the load S1 for a first charge-discharge cycle of the inductor 218. As can be seen during this cycle, the duty control logic circuitry 212 begins the discharge portion of the charge-discharge cycle in response to receiving a current limiter signal HSILIM at time $t_{11}$.

The voltage VOUT<2> supplied to the load S2 continues to fall throughout this period and drops to the LDO target voltage LDO<2>_TARGET for the load S2 at time $t_{12}$. As a result, the LDO 230a begins to conduct, thus providing current LDO<2> CURRENT to the load S2. By setting the target voltage LDO<2>_TARGET of the LDO 230a just below the minimum target voltage DCDC<2>_TARGETL for the Buck converter 204, as shown in FIG. 3, the need for dedicated logic circuitry to facilitate a handover between the Buck converter 204 and the LDO 230a is removed.

Thus, between the times $t_{12}$ and $t_{17}$, the voltage VOUT<2> supplied to the load S2 is maintained at the LDO target voltage LDO<2> TARGET by the LDO 230a, while the Buck converter 204 is available to supply voltage to the other loads S1, S0.

Between times $t_{13}$ and $t_{14}$, the output of the Buck converter 204 continues to be provided to the load S1, as the voltage VOUT<1> provided supplied to the load S1 does not reach the upper target voltage DCDC<1>_TARGETH during this period.

At time $t_{14}$, the voltage VOUT<0> supplied to the other primary load S0 drops to the minimum target voltage DCDC<0>_TARGETL. As a result, the minimum-threshold comparator 214c of the controller 214 asserts a logic high signal VOUTCMP0 at time $t_{14}$. Thus, at time $t_{14}$ two channel request signals VOUTCMP1, VOUTCMP0 are asserted at the same time.

The channel logic circuitry 210 determines which of the output channels to activate, according to predetermined logic. In this instance, neither of the channel request signals VOUTCMP1, VOUTCMP0 corresponds to the low-priority load S2, so the channel logic circuitry 210 may choose to serve either request. The channel logic circuitry 210 may cycle between the channels supplying the primary loads S0, S1 equally.

The logic to determine the chosen channel (supplying one of the primary loads S0, S1) is configured so as to minimise the waiting time for a particular primary load S0, S1. Thus, the channel logic circuitry 210 is capable of determining how recently a particular channel was made active, and can use this information to determine the next channel to be made active. In this case, at time $t_{14}$, the channel logic circuitry 210 switches the active channel from the channel supplying load S1 to the channel supplying load S0. This is done by ceasing to output the channel selection signal DRVS<1> and instead outputting the channel selection signal DRVS<0>.

During the period between $t_{14}$ and tis, current COILCURRENT is delivered to load S0 in the same way as that described above. At time $t_{15}$, the channel logic circuitry 210 ceases to output the channel selection signal DRVS<0> and once again outputs the channel selection signal DRVS<1>, as the channel request signal VOUTCMP1 is still asserted. Thus, between times $t_{15}$ and $t_{16}$, current COILCURRENT is delivered to load S1 in the same way as that described above. Meanwhile, the LDO 230a continues to provide voltage VOUT<2> to the load S2.

At time $t_{16}$, however, only the channel request signal VOUTCMP2 is still asserted, as the voltage VOUT<1>, VOUT<0> supplied to the loads S1, S0 is above the respective upper target voltages DCDC<1>_TARGETH, DCDC<0>_TARGETH. Therefore, the channel logic circuitry 210 switches the active channel from the channel supplying load S1 to the channel supplying load S2.

Between time $t_{16}$ and $t_{17}$, the output of the Buck converter 204 is provided to the load S2 in addition to the output of the LDO 230a. This means that, at time $t_{17}$, the voltage VOUT<2> supplied to the load S2 increases above the LDO target voltage LDO<2> TARGET, which means that, from time $t_{17}$, the LDO 230a ceases to supply the load S2. During the period between $t_{17}$ and $t_{18}$, therefore, the voltage VOUT<2> is supplied only by the Buck converter 204.

At time $t_{18}$, the voltage VOUT<1> supplied to load S1 drops to the minimum target voltage DCDC<1>_TARGETL. Therefore, at this time, the channel request signal VOUTCMP1 is asserted. At time $t_{19}$, once the charge-discharge cycle has completed, the channel logic circuitry 210 switches the active channel from the channel supplying load S2 to the channel supplying load S1.

Although both the channel request signal VOUTCMP1 and the channel request signal VOUTCMP2 are logic high at time $t_{19}$, the channel corresponding to the channel request signal VOUTCMP2 is the channel supplying the low-priority load. Thus, the channel logic circuitry 210 issues the channel request signal DRVS<1>, rather than the channel request signal DRVS<2>, so as to switch the active channel to that supplying S1.

At time $t_{20}$, the channel request signal VOUTCMP1 is deasserted, as the voltage VOUT<1> supplied to the load S1 has risen above the upper target voltage DCDC<1>_TARGETH and the charge-discharge cycle of the Buck converter 204 has completed. This allows the channel logic circuitry 210 to switch the active channel back to the channel supplying the low-priority load S2, as this channel is the only channel at time $t_{20}$ for which a channel request signal VOUTCMP2 is asserted.

At time $t_{21}$, the voltage supplied to the load S2 increases above the upper target voltage DCDC<2>_TARGETH, meaning that the channel request signal VOUTCMP2 is deasserted.

Figure 4:
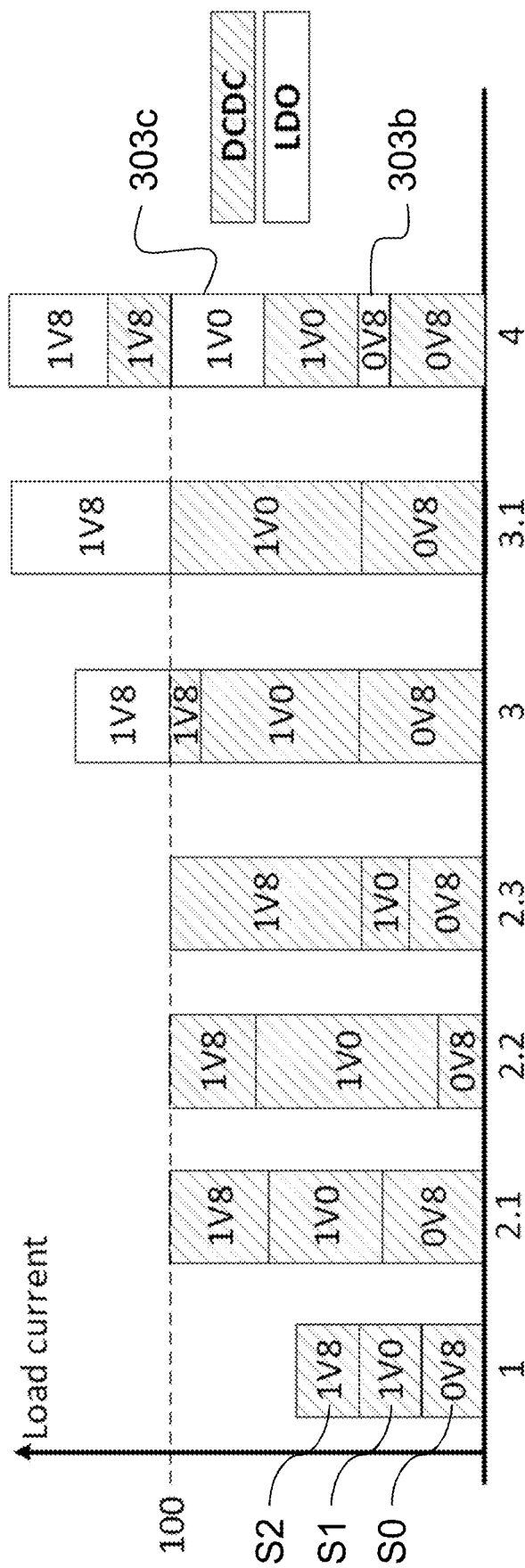
FIG. 4 is a graph of the utilisation of the DCDC converter and the LDO of the circuit shown in FIG. 2 for various loading scenarios.

FIG. 4 is a graph of the utilisation of the Buck converter 204 and the LDO 203a of the circuit shown in FIG. 2 for various loading scenarios.

In the first scenario (Scenario 1), the current required by each of the loads S0 (0V8), S1 (1V0), S2 (1V8) is relatively low and is substantially equal for each of the loads. In this first scenario, the current demand for each of the loads S0, S1, S2 can be satisfied comfortably by the Buck converter 204 alone.

In the second scenario (Scenario 2.1), the current required by each of the loads S0, S1, S2 has increased. The loading across the three loads S0, S1, S2 is still substantially equal, but the Buck converter 204 is now operating at maximum capacity. The current demands for each of the loads S0, S1, S2 are being satisfied by the Buck converter 204 alone.

In the third scenario (Scenario 2.2), the current required by the loads S0 and S2 is substantially lower than the current required by the load S1, which is relatively high. As for the second scenario, the Buck converter 204 is operating at maximum capacity, albeit operating in a different sequence to satisfy the current demands for each of the loads S0, S1, S2 without assistance from the LDO 230a.

In the fourth scenario (Scenario 2.3), the current required by the loads S0 and S1 is substantially lower than the current required by the load S2, which is relatively high. As for the second and third scenarios, the Buck converter 204 is operating at maximum capacity, but is satisfying the current demands for each of the loads S0, S1, S2 without assistance from the LDO 203a.

In the fifth scenario (Scenario 3), the current required by each of the loads S0, S1, S2 is relatively high and is substantially equal for each of the loads. As a result, the total current demand is greater than that which can be provided by the Buck converter 204 alone.

In this scenario, the channel that is arranged to provide current to the load S2 has been deprioritised by the channel logic circuitry 210 so that the load S2 receives the output of the Buck converter 204 less frequently. Thus, the primary loads S1, S0 are able to receive 90% of the output of the Buck converter 204, leaving the remaining 10% for the low-priority load S2. As 10% of the output of the Buck converter 204 is insufficient to meet the full demand of the low priority load S2, the LDO 203a assists the Buck converter 204 by supplying additional current to the load S2.

In the sixth scenario (Scenario 3.1), the channel supplying load S2 from the Buck converter 204 has now been fully deprioritised by the channel logic circuitry 210 so that the load S2 receives none of the output of the Buck converter 204. This allows the Buck converter 204 to provide current only to the load S0 and the load S1, which means that the load S1 can receive a greater proportion of the current output by the Buck converter 204 while the load S2 is supplied solely by the LDO 203a.

In the seventh scenario (Scenario 4), shown for reference purposes only, the loading is the same as for the sixth scenario, but the channel logic circuitry 210 is not configured to deprioritise the channel supplying the load S2 in accordance with the present invention. As a result, the Buck converter 204 is attempting to supply current to all three of the loads S0, S1, S2, despite the total current demand being over the Buck converter's 204 capacity. Therefore, in order to satisfy the current demands of each of the loads S0, S1, S2, two additional LDOs are required to provide current 303b, 303c to the loads S0 and S1 respectively. The provision of additional LDOs can increase the cost of manufacture of the circuit 202, as well as the overall size of the circuit 202.

The table below shows the input current $I_{in}$ required by the circuit 202 for the sixth and seventh scenarios (Scenarios 3.1 and 4), together with:

- the input voltage $V_{in}$;
- the current $I_{LDO\_0}$ provided by the LDO supplying the load S0;
- the current $I_{Buck\_0}$ provided by the Buck converter 204 to the load S0;
- the current $I_{LDO\_1}$ provided by the LDO supplying the load S1;
- the current $I_{Buck\_1}$ provided by the Buck converter 204 to the load S1;
- the current $I_{LDO\_2}$ provided by the LDO 203a supplying the load S2; and
- the current $I_{Buck\_2}$ provided by the Buck converter to the load S2.

| | $I_{in}$ (mA) | $V_{in}$ (V) | $I_{LDO_0}$ (mA) | $I_{Buck_0}$ (mA) | $I_{LDO_1}$ (mA) | $I_{Buck_1}$ (mA) | $I_{LDO_2}$ (mA) | $I_{Buck_2}$ (mA) |
|---|---|---|---|---|---|---|---|---|
| Scenario 3.1 | 86.8 | 3.0 | 0.0 | 40.0 | 0.0 | 60.0 | 50.0 | 0.0 |
| Scenario 4 | 98.1 | 3.0 | 6.7 | 33.3 | 26.7 | 33.3 | 16.7 | 33.3 |

The input current $I_{in}$ is given by:

$$I_{in} = I_{LDO\_0} + I_{LDO\_1} + I_{LDO\_2} + 1.2 * \left( I_{Buck\_0}\left(\frac{V_{out_0}}{V_{in}}\right) + I_{Buck_1}\left(\frac{V_{out_1}}{V_{in}}\right) + I_{Buck_2}\left(\frac{V_{out2}}{V_{in}}\right)\right),$$

where $V_{out_0}$=0.8 V is the voltage across the load S0, $V_{out_1}$=1.0 V is the voltage across the load S1, and $V_{out_2}$=1.8 V is the voltage across the load S2.

The efficiency of the Buck converter 204 is assumed to be 83% and the quiescent current $I_q$ for each LDO is assumed to be zero.

As can be seen, the embodiment of the present invention in the sixth scenario (Scenario 3.1) provides approximately a 12% reduction in input current in comparison to the seventh scenario (Scenario 4), in which channel deprioritisation was not performed. Thus, embodiments of the present invention can allow a reduction in input current $I_{in}$ for a given loading. It will also be appreciated that since the load S2 which has an associated LDO 230a is preferentially de-prioritised, allowing the Buck converter to focus on the other loads S0, S1 it is not necessary to provide a corresponding LDO for each of the loads.

The invention claimed is:

1. A circuit portion comprising:
    a DCDC converter arranged to provide current from an output of the converter to one of a plurality of loads at a time, wherein the plurality of loads comprises at least a low priority load and a primary load;
    a controller configured to detect when a voltage across the primary load from the DCDC converter is below a first threshold for the primary load;
    channel logic circuitry configured, in response to the controller detecting, while the DCDC converter is providing current to the low priority load, that the voltage across the primary load is below the first threshold for the primary load, to stop providing current from the output of the converter to the low priority load and to provide current from the output of the converter to the primary load; and
    a voltage regulator configured to provide current to the low priority load when the voltage across the low priority load is below a second threshold for the low priority load.

2. The circuit portion of claim 1, wherein the plurality of loads comprises a plurality of primary loads, in addition to the low priority load, and wherein the controller is configured to monitor a voltage across each of the plurality of primary loads.

3. The circuit portion of claim 1, wherein the low priority load requires a higher voltage than the primary load.

4. The circuit portion of claim 1, wherein the controller is configured to detect when a voltage across the low priority load from the DCDC converter is below a first threshold for the low priority load.

5. The circuit portion of claim 4, wherein:
the controller is configured to detect that the voltage across the primary load is greater than an upper threshold; and
the channel logic circuitry is configured, in response to the controller detecting, while the DCDC converter is providing current to the primary load, that the voltage across the low priority load is below the first threshold for the low priority load, to continue to provide current from the output of the converter to the primary load at least until the controller detects that the voltage across the primary load is greater than the upper threshold for the primary load.

6. The circuit portion of claim 4, wherein the channel logic circuitry is only configured to provide current to the low priority load from the DCDC converter if the primary load is not undersupplied.

7. The circuit portion of claim 6, wherein:
the plurality of loads comprises a plurality of primary loads;
the controller is configured to monitor a voltage across each of the plurality of primary loads; and
the channel logic circuitry is configured, in response to the controller detecting that the voltage across the low priority load is below the first threshold for the low priority load, to provide current from the output of the converter to the low priority load only if the voltage across each of the primary loads is above the respective first threshold for the primary loads.

8. The circuit portion of claim 1, wherein the voltage regulator comprises a low-dropout voltage regulator.

9. The circuit portion of claim 8, wherein the second threshold for the low priority load is equal to a target voltage of the low-dropout regulator.

10. The circuit portion of claim 1, wherein the second threshold for the low priority load is less than the first threshold for the low priority load.

11. The circuit portion of claim 1, wherein the controller is configured, in response to detecting that the voltage across a load of the plurality of loads is lower than the first threshold for the load, to issue a channel request signal that identifies the load.

12. The circuit portion of claim 11, wherein the controller is configured, in response to detecting that the voltage across the load is greater than an upper target voltage for the load, to stop issuing said channel request signal identifying the load.

13. The circuit portion of claim 11, wherein the channel logic circuitry is arranged to use the channel request signal to determine whether to provide current from the output of the converter to the load.

* * * * *